United States Patent
Rivera, Jr.

(10) Patent No.: US 12,539,216 B2
(45) Date of Patent: Feb. 3, 2026

(54) PROSTHETIC IMPLANT REMOVAL TOOL AND ASSOCIATED METHOD

(71) Applicant: DePuy Ireland Unlimited Company, Ringaskiddy (IE)

(72) Inventor: Jose S. Rivera, Jr., Naples, FL (US)

(73) Assignee: DEPUY IRELAND UNLIMITED COMPANY, Cork (IE)

( * ) Notice: Subject to any disclaimer, the term of this patent is extended or adjusted under 35 U.S.C. 154(b) by 0 days.

(21) Appl. No.: 18/596,730

(22) Filed: Mar. 6, 2024

(65) Prior Publication Data

US 2024/0197485 A1    Jun. 20, 2024

Related U.S. Application Data

(63) Continuation of application No. 17/127,006, filed on Dec. 18, 2020, now Pat. No. 11,938,032, which is a
(Continued)

(51) Int. Cl.
  *A61F 2/46* (2006.01)
  *A61B 17/92* (2006.01)
  (Continued)

(52) U.S. Cl.
  CPC ............ *A61F 2/3609* (2013.01); *A61B 17/92* (2013.01); *A61F 2/30771* (2013.01);
  (Continued)

(58) Field of Classification Search
  CPC ............ A61F 2002/4619; A61F 2/4607; A61F 2/4603; A61B 17/1664; A61B 17/155;
  (Continued)

(56) References Cited

U.S. PATENT DOCUMENTS

| 4,222,382 A | 9/1980 | Antonsson et al. |
| 4,736,738 A | 4/1988 | Lipovsek et al. |

(Continued)

FOREIGN PATENT DOCUMENTS

| GB | 2560956 A | 10/2018 |
| JP | 2013523289 A | 6/2013 |

(Continued)

OTHER PUBLICATIONS

Japanese Office Action issued Jan. 31, 2024 in corresponding Japanese Patent Application No. 2021-572565, 7 pages.
(Continued)

*Primary Examiner* — Matthew J Lawson
(74) *Attorney, Agent, or Firm* — XSENSUS LLP (57) ABSTRACT

A tool and an associated method for removing a prosthetic implant includes a lateral tool, a first impact tool secured to the lateral tool, a medial tool, and a second impact tool. Although the tool can be used to remove a variety of different prosthetic implants, it finds particular application in the removal of femoral implants. Both lateral and medial tools are utilized. The lateral tool includes a generally arcuate shape with upstanding sidewalls that define an arcuate interior. The lateral tool is thus dimensioned to follow the contour of the lateral side of a femoral implant. The medial tool includes opposing side walls that define an interior opening. The opening is sized to receive the neck of the femoral implant, thereby allowing the tool to closely follow the medial bone/implant interface.

10 Claims, 12 Drawing Sheets

Related U.S. Application Data continuation-in-part of application No. 16/431,879, filed on Jun. 5, 2019, now Pat. No. 11,191,651.

(51) Int. Cl.
  *A61F 2/30* (2006.01)
  *A61F 2/36* (2006.01)

(52) U.S. Cl.
  CPC ...... *A61F 2/4607* (2013.01); *A61B 2017/922* (2013.01); *A61F 2002/30841* (2013.01); *A61F 2002/3625* (2013.01)

(58) Field of Classification Search
  CPC ... A61B 17/1604; A61B 17/16; A61B 17/164; A61B 17/1668; A61B 17/1732; A61B 17/1735; A61B 17/1742
  See application file for complete search history.

(56) References Cited

U.S. PATENT DOCUMENTS

| | | | |
|---|---|---|---|
| 4,838,853 | A | 6/1989 | Parisi |
| 5,019,083 | A | 5/1991 | Klapper et al. |
| 5,167,619 | A | 12/1992 | Wuchinich |
| 5,257,995 | A | 11/1993 | Umber et al. |
| D344,801 | S | 3/1994 | Hughes et al. |
| 5,318,570 | A | 6/1994 | Hood et al. |
| 5,342,366 | A | 8/1994 | Whiteside et al. |
| 5,405,349 | A | 4/1995 | Burkinshaw et al. |
| 5,716,405 | A * | 2/1998 | Mittelman ............. A61F 2/186 623/10 |
| 5,820,315 | A | 10/1998 | Collard |
| 5,885,301 | A | 3/1999 | Young |
| 5,961,522 | A | 10/1999 | Mehdizadeh |
| 6,126,664 | A | 10/2000 | Troxell et al. |
| 6,187,012 | B1 | 2/2001 | Masini |
| 6,790,211 | B1 | 9/2004 | McPherson et al. |
| 7,744,616 | B2 | 6/2010 | O'Donoghue |
| 7,935,118 | B2 | 5/2011 | Vendrely et al. |
| 8,545,507 | B2 | 10/2013 | Vendrely et al. |
| 9,603,720 | B2 | 3/2017 | Kelley |
| 9,867,628 | B2 | 1/2018 | Macke |
| 9,876,628 | B2 | 1/2018 | Golitschek Edler Von Elbwart et al. |
| 10,751,070 | B2 | 8/2020 | Pendleton et al. |
| 11,191,651 | B1 | 12/2021 | Rivera, Jr. |
| 2002/0068941 | A1 | 6/2002 | Hanson et al. |
| 2002/0091387 | A1 | 7/2002 | Hoogland |
| 2003/0236525 | A1 | 12/2003 | Vendrely et al. |
| 2004/0162619 | A1 | 8/2004 | Blaylock et al. |
| 2005/0090829 | A1* | 4/2005 | Martz ................ A61B 17/1604 606/167 |
| 2005/0251146 | A1 | 11/2005 | Martz et al. |
| 2007/0123893 | A1 | 5/2007 | O'Donoghue |
| 2008/0188878 | A1 | 8/2008 | Young |
| 2010/0069909 | A1* | 3/2010 | Taylor ................... A61F 2/4607 606/82 |
| 2010/0100097 | A1 | 4/2010 | Wong |
| 2011/0004214 | A1 | 1/2011 | Skaggs |
| 2011/0288555 | A1 | 11/2011 | Szanto |
| 2012/0089147 | A1* | 4/2012 | Kuczynski ........... A61B 17/155 606/88 |
| 2012/0283793 | A1 | 11/2012 | Burroughs, III |
| 2013/0226189 | A1 | 8/2013 | Young |
| 2014/0276835 | A1 | 9/2014 | Tally |
| 2014/0371750 | A1 | 12/2014 | Klein et al. |
| 2015/0039037 | A1 | 2/2015 | Donner et al. |
| 2015/0196402 | A1 | 7/2015 | Kim |
| 2016/0338751 | A1 | 11/2016 | Kellar et al. |
| 2018/0206859 | A1* | 7/2018 | Pendleton .......... A61B 17/1637 |
| 2018/0221171 | A1 | 8/2018 | Termanini et al. |
| 2018/0280036 | A1 | 10/2018 | Agunloye et al. |
| 2019/0336143 | A1* | 11/2019 | Wright ................ A61B 17/1778 |
| 2020/0261247 | A1* | 8/2020 | Stchur ................... A61F 2/4014 |
| 2021/0353432 | A1 | 11/2021 | Rivera, Jr. |
| 2023/0172622 | A1 | 6/2023 | Wright |
| 2024/0108475 | A1* | 4/2024 | Rivera, Jr. ............ A61F 2/4603 |

FOREIGN PATENT DOCUMENTS

| | | | |
|---|---|---|---|
| JP | 2013208430 | A | 10/2013 |
| JP | 2018525121 | A | 9/2018 |
| WO | 92/22259 | A2 | 12/1992 |
| WO | 2012006508 | A2 | 1/2012 |
| WO | 2020/247064 | A1 | 12/2020 |
| WO | 2022/140801 | A2 | 6/2022 |

OTHER PUBLICATIONS

Extended European search report issued on Jun. 15, 2023, in corresponding European patent Application No. 227 40032.2, 8 pages.
Office Action issued on Dec. 30, 2022, in corresponding Chinese patent Application No. 202080054684.7, with partial English translation, 4 pages.
Chinese Office Action issued Jun. 13, 2022, in corresponding Chinese Application No. 202080054684.7.
Extended European Search Report issued Aug. 5, 2022, in corresponding European Application No. 20817983.8.
International Search Report and Written Opinion mailed on Jun. 22, 2022, corresponding PCT/US22/13102, 11 pages.
Rivera Surgical, "Watson Extraction System", YouTube demonstration, Oct. 23, 2020, available URL: https://www.youtube.com/walch?v=CrD5vsMujiA.
U.S. Final Office Action issued Jan. 31, 2025 in co-pending U.S. Appl. No. 18/389,795, 57 pages.
Brazilian Preliminary Office Action issued Jun. 25, 2024 in corresponding Brazilian Patent Application No. BR112021024631-2, 5 pages.
International Search Report for PCT/US/20/27692 with an International filing date of Apr. 10, 2020, and mailed on Jul. 17, 2020.
U.S. Office Action issued Mar. 28, 2023 in co-pending U.S. Appl. No. 17/515,941.
U.S. Final Office Action issued Jun. 6, 2023 in co-pending U.S. Appl. No. 17/515,941.
U.S. Office Action issued Sep. 18, 2024 in co-pending U.S. Appl. No. 18/389,795.
U.S. Notice of Allowance issued Sep. 28, 2024 in co-pending U.S. Appl. No. 17/515,941.
U.S. Office Action issued Oct. 15, 2024 in co-pending U.S. Appl. No. 17/387,805.
Japanese Office Action issued Oct. 16, 2024 in corresponding Japanese Patent Application No. 2021-572565, 4 pages.
Korean Office Action issued Jan. 21, 2025 in corresponding Korean Patent Application No. 2022-7000296, 9 pages.
U.S. Office Action issued Feb. 13, 2025 in co-pending U.S. Appl. No. 17/628,453, 108 pages.
U.S. Notice of Allowance issued Apr. 23, 2025 in co-pending U.S. Appl. No. 17/387,805, 87 pages.
U.S. Notice of Allowance issued Jul. 7, 2025 in co-pending U.S. Appl. No. 17/387,805, 82 pages.
U.S. Notice of Allowance issued Jul. 17, 2025 in co-pending U.S. Appl. No. 17/628,453, 78 pages.
U.S. Nonfinal Office Action issued Jul. 9, 2025 in co-pending U.S. Appl. No. 18/389,795, 102 pages.
Australian Examination Report issued Jul. 14, 2025 in corresponding Australian Patent Application No. 2020286413, 4 pages.
International Search Report issued Mar. 30, 2022 in corresponding International Patent Application No. PCT/US22/12238, 1 page.
Korean Notice of Allowance issued May 26, 2025 in corresponding Korean Patent Application No. 10-2022-7000296, 4 pages.
Japanese Notice of Allowance issued Jun. 3, 2025 in corresponding Japanese Patent Application No. 2021-572565, 4 pages (with machine-generated translation).
U.S. Notice of Allowance issued Jun. 13, 2025 in co-pending U.S. Appl. No. 17/628,453, 82 pages.

(56) References Cited

OTHER PUBLICATIONS

Japanese Office Action issued Aug. 19, 2025 in corresponding Japanese Patent Application No. 2022-563463, 10 pages.
Australian Examination Report issued Oct. 23, 2025 in corresponding Australian Patent Application No. 2020286413, 3 pages.
Brazilian Office Action issued Nov. 11, 2025 in Brazilian Patent Application No. BR112021024631-2, 6 pages.
Japanese Notice of Allowance issued Nov. 25, 2025 in Japanese Patent Application No. 2022-563463, 5 pages.
U.S. Notice of Allowance issued Dec. 2, 2025 in co-pending U.S. Appl. No. 18/389,795, 104 pages.

* cited by examiner

PROSTHETIC IMPLANT REMOVAL TOOL AND ASSOCIATED METHOD

CROSS-REFERENCE TO RELATED APPLICATIONS

This application is a continuation of application Ser. No. 17/127,006, filed on Dec. 18, 2020, which claims priority to and is a continuation-in-part of application Ser. No. 16/431,879, filed on Jun. 5, 2019 (now U.S. Pat. No. 11,191,651) and entitled "Implant Removal Tool." The contents of each are fully incorporated herein for all purposes.

TECHNICAL FIELD

This disclosure relates to a tool for removing a prosthetic implant. More particularly, the present disclosure relates to tools and associated methods for minimizing bone loss during the removal of a prosthetic.

BACKGROUND OF THE INVENTION

Joint arthroplasty is increasingly common in the United States and around the world. Arthroplasty can involve the complete or partial replacement of hips, knees, or shoulders. Of these, hip replacements are the most common form of surgery. During a hip replacement, the surgeon replaces the socket of the hip bone, known as the acetabulum, with an acetabular cup. The head of the femur is also replaced with a femoral implant. Femoral implants include a stem that is inserted into the superior end of the femur and an angled neck that extends upwardly. The neck mimics the natural neck of the femur and provides an attachment point for a head to be attached. These implants include coatings and texturing to promote bone growth to affix the implant to the femur and hip socket.

Most hip replacements last for approximately 25 years. After this time the acetabular cup and femoral implants may fail and need to be repaired or replaced. As life expectancy in general increases, people are living with artificial hips for longer periods of time. As a result, hip revision surgeries are on the rise. Hip revisions surgeries can be complicated and often pose more risk than the original hip replacement. During revision surgeries surgeons attempt to remove the existing implants while minimizing damage to surrounding bone and tissue. This is often a difficult task as implants are designed to join with the surrounding bone over time. Minimizing the loss of this bone during a revision helps the new implant to be properly affixed. It also reduces the length and cost of the revision surgery and further reduces recovery time. Efforts have been made over the years to provide tools that aid in the efficient removal of a prosthetic.

One example of this is disclosed in U.S. Pat. No. 9,867,628 to Macke. Macke relates to a method for the extraction of medical implants. In accordance with the method, a surgical cutting guide is attached to an implanted prosthesis. An osteotome is directed through a slot in the surgical cutting guide to a specified location at the interface between the prosthesis and the bone. The prosthesis is dislodged using the osteotome. The osteotome is then withdrawn through the slot. The slot can include a curvature to assist with minimize bone loss.

Another implant removal tool is disclosed by U.S. Pat. No. 6,187,012 to Masini. Masini discloses a guide means for directing a cutting tool into the interface between a prosthesis and the surrounding bone. The guide means is used to bring about a more controlled separation and removal of the prosthesis. The guide may be placed on the prosthesis itself or it may be placed on a separate component. In the case of a femoral implant, the guide can include tracks, channels, or groves that are oriented along the stem of the implant.

U.S. Pat. No. 5,257,995 to Umber discloses an apparatus for removing a prosthesis from a bone. The device includes a cutting tool having a cutting tip and an elongated shank that is designed to allow significant lateral flexing. A motor is included to provide rotational motion to the cutting tool. A handle is also provided that is designed to be held in the hand opposite of the cutting tool. The handle includes a bearing carrier with a hole for receiving the shank of the cutting tool. The surgeon manipulates the handle and cutting tool to cut a perimeter around the prosthesis.

A further example is illustrated in U.S. Pat. No. 10,751,070 to Pendleton. The Pendleton device has at least one blade connected to a handle. The shape of the blade conforms to a portion of the implant so that a cutting tip of the blade can be positioned in a desired position relative to the implant and the femur. Force is applied to the handle so that the cutting tip of the blade cuts through bone growth from the femur into the implant.

Although the background art illustrates various devices and techniques for removing prosthetics, all suffer from significant drawbacks. Namely, the devices of the background art rely upon the skill of the surgeon and do not include tools that adequately accommodate the shape of the prosthetic being removed or that otherwise minimizes bone loss. The implant removal tool of the present disclosure is aimed at overcoming these and other shortcomings present in the background art.

SUMMARY OF THE INVENTION

This disclosure relates to a tool and an associated method for the efficient removal of prosthetics.

The disclosed tool has several important advantages. For example, the tool is shaped to conform to the interface between the bone and the prosthetic. The tool may also include an opening to accommodate extensions of the prosthetic. All of this allows for the efficient removal of the prosthetic.

Both lateral and medial tools can be provided for separating the lateral and medial sides of the prosthetic from the surrounding bone.

The tools may be curved or angled to match the profile of the prosthetic, thereby allowing the tool to be inserted as closely as possible along bone/prosthetic interface.

The tools may also include an opening to accommodate the neck of a femoral implant, thereby allowing the tool to be inserted along the edge that is immediately adjacent to the stem.

The edges around the opening may be sharpened to cut the anterior and posterior sides of the implant while at the same time cutting along the medial aspect.

An advantage of the tools of the present disclosure is that they allow prosthetics to be removed efficiently and in a minimal amount of time.

A further advantage of the tools is that they allow prosthetics to be removed while minimizing the loss of existing bone.

Still yet a further advantage of the tools is that the efficient removal of the prosthetics greatly decreases recovery time.

Another advantage is that the efficient removal of prosthetics reduces both the need for anesthesia and operating room costs in general.

Various embodiments of the invention may have none, some, or all of these advantages. Other technical advantages of the present invention will be readily apparent to one skilled in the art.

BRIEF DESCRIPTION OF THE DRAWINGS

For a more complete understanding of the present disclosure and its advantages, reference is now made to the following descriptions, taken in conjunction with the accompanying drawings, in which.

Similar reference numerals refer to similar parts throughout the several views of the drawings.

| Parts List |
|---|
| 20 Femoral Implant |
| 22 Lateral Side of Implant |
| 24 Medial Side of Implant |
| 26 Stem of Implant |
| 28 Femur |
| 32 Textured Extent of Implant |
| 34 Neck of Implant |
| 36 Lateral Tool |
| 38 Proximal End of Lateral Tool |
| 42 Distal End of Lateral Tool |
| 44 Threaded Aperture of Lateral Tool |
| 46 Outer Wall of Lateral Tool |
| 48 Arcuate Extent of Outer Wall |
| 52 Lateral Anterior/Posterior Walls |
| 54 Interior Area of Lateral Tool |

| Parts List |
|---|
| 56 Angled Extent of Lateral Anterior or Posterior Wall |
| 58 Curved Extent of Anterior/Posterior Side Wall |
| 60 Sharpened Edges |
| 62 Window in Lateral Anterior/Posterior Wall |
| 64 Leading Edge of Lateral Tool |
| 66 Medial Tool |
| 68 Proximal End of Medial Tool |
| 72 Distal End of Medial Tool |
| 74 Opposing Side Walls of Medial Tool |
| 76 Inner Sharpened Edge of Side Wall |
| 78 Outer Edge of Anterior/Posterior Wall |
| 80 Sharpened Edges |
| 82 Opening in Medial Tool |
| 84 Trough of Medial Tool |
| 86 Leading Edge of Medial Tool |
| 88 First Impact Tool |
| 90 Weighted Slide |
| 92 Threaded Extent of First Impact Tool |
| 94 Guide of First Impact Tool |
| 96 Second Impact Tool |
| 98 Threaded Extent of Second Impact Tool |
| 100 Weighted Slide |
| 102 Guide of Second Impact Tool |
| 104 Alternate Embodiment of Lateral Tool |
| 106 Straight Edge of an Alternative Lateral Tool |
| 108 Curved Leading Edge of an Alternative Lateral Tool |
| 112 Alternate Embodiment of Medial Tool |
| 114 Cut Out in the Alternative Medial Tool |
| 116 U-shaped Sharpened Edge of Opening |
| 118 Opening in the Alternative Medial Tool |
| 120 Nut Securing Impact Tool |

DETAILED DESCRIPTION OF THE DRAWINGS

The present disclosure relates to a tool and an associated method for removing a prosthetic implant. Although the tool can be used to remove a variety of different prosthetic implants, it finds particular application in the removal of femoral implants. In one embodiment, both lateral and medial tools are utilized. In a preferred but non-limiting embodiment, the lateral tool includes a generally arcuate shape with upstanding sidewalls that define an arcuate interior. The lateral tool is thus dimensioned to follow the contour of the lateral side of a femoral implant. The medial tool, in one embodiment, includes opposing side walls that define an interior opening. The opening is sized to receive the neck of the femoral implant, thereby allowing the tool to closely follow the medial bone/implant interface. The details of these tools, and the manner in which they can be employed, are discussed in greater detail hereinafter.

Figure 13:
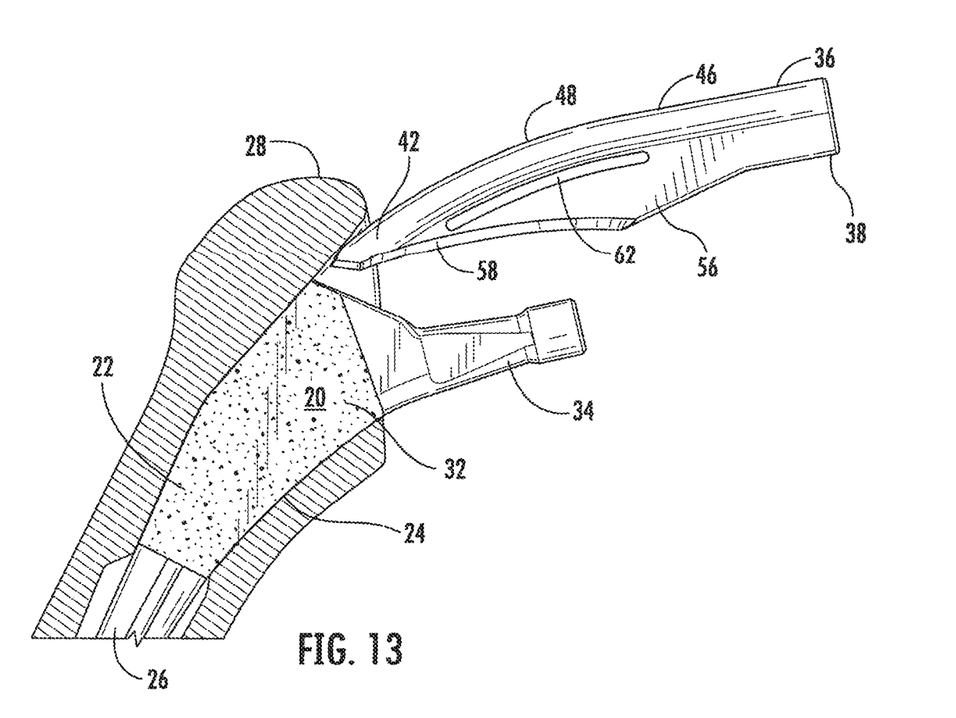
FIGS. 13-15 illustrate the insertion of the lateral implant removal tool.
Figure 14:
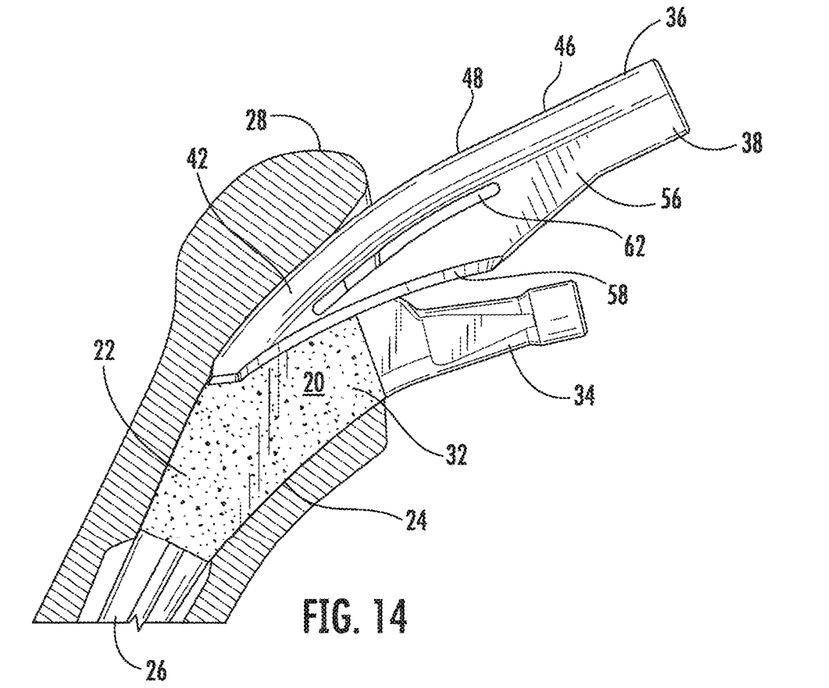
Figure 15:
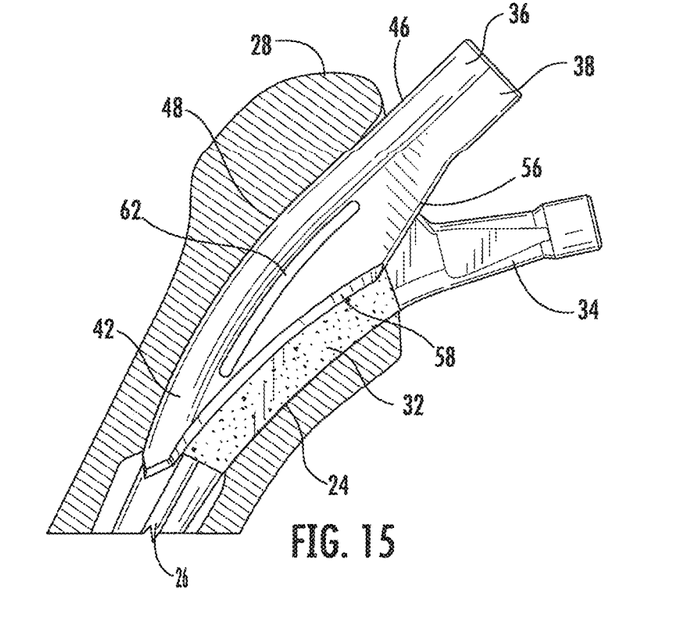
Figure 16:
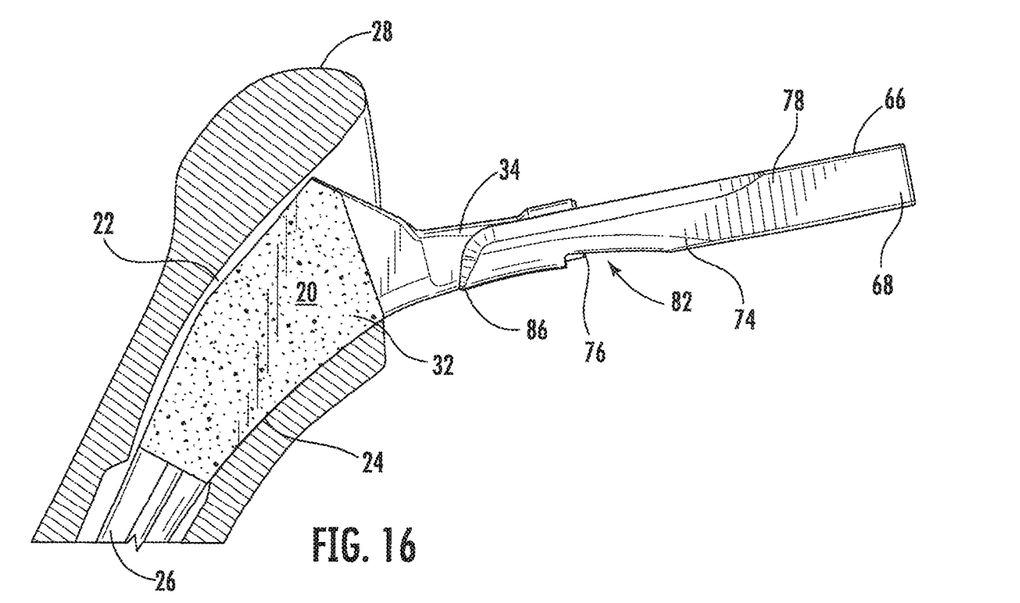
FIGS. 16-17 illustrate the insertion of the medial implant removal tool.
Figure 17:
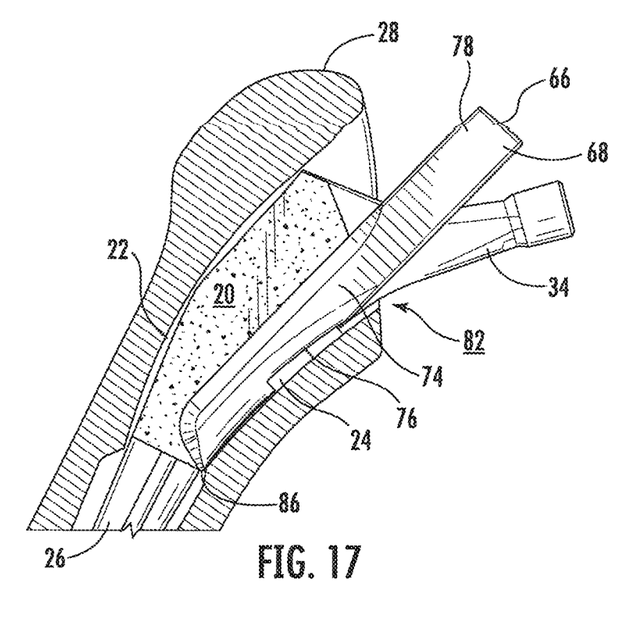

The disclosed tools are specifically designed to release an implanted prosthesis by closely following the bone/implant interface. The tools can be employed to remove a wide variety of different prosthetics, such as shoulder and hip implants. However, in the preferred embodiment, the tools are used to cut around, dislodge, and remove a femoral implant 20. As depicted in FIG. 13, these femoral implants 20 generally include a lateral (or outer) side 22 and a medial (or inner) side 24. Implant 20 further include a stem 26 that is inserted into the superior end of the femur bone 28. Various coatings and texturing can be employed for promoting bone growth and the grafting of the implant 20 to the femur 28. As illustrated, implant 20 includes a textured portion 32 at its upper portion where bone growth and proper affixation are most important. Femoral implant 20 also includes a neck 34 that is angled with respect to the body of the implant 20. A head (not shown) is then secured to the end of the neck 34, with the head ultimately being fitted into the acetabular cup (not shown).

Lateral Implant Removal Tool

Figure 1:
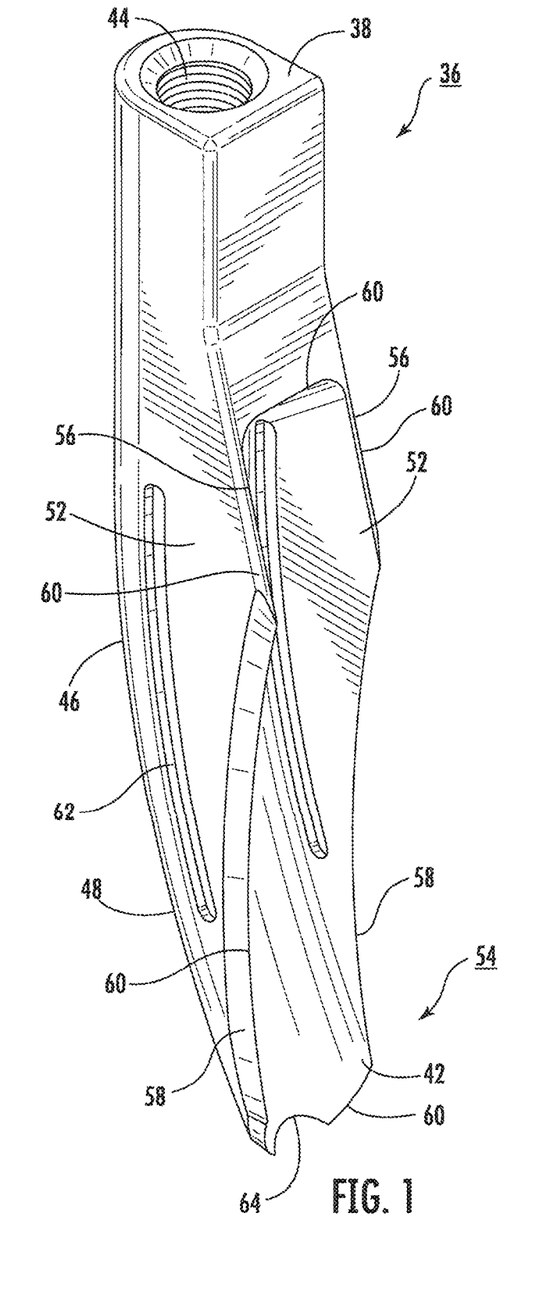
FIG. 1 is a perspective view of the lateral implant removal tool.
Figure 2:
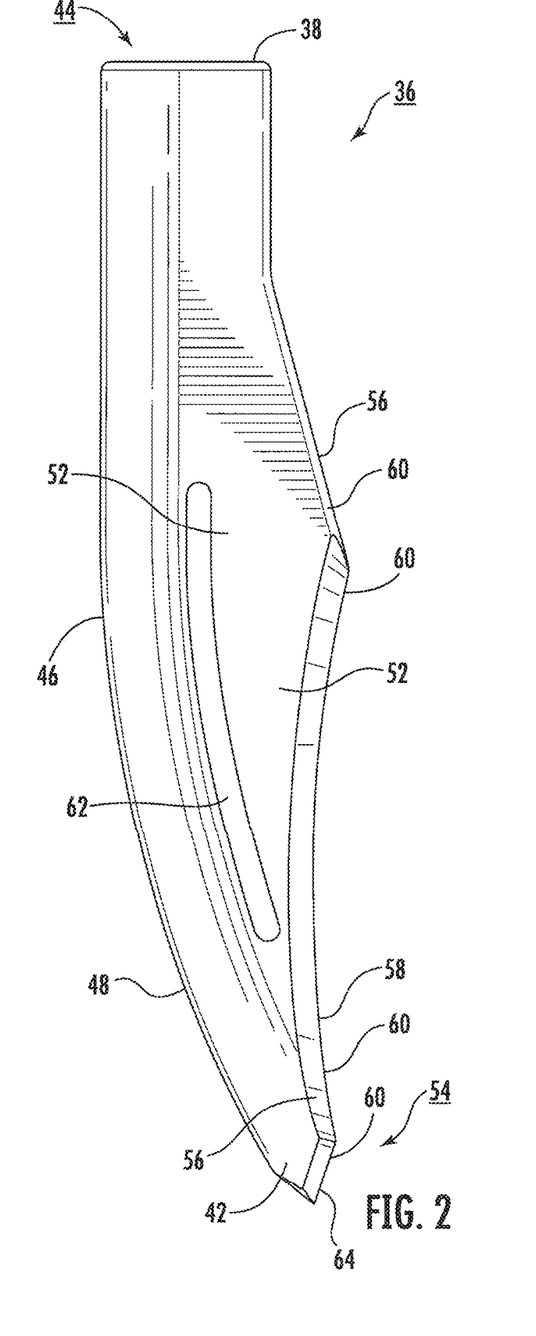
FIG. 2 is a side view of the lateral implant removal tool.

With reference to FIGS. 1-2, the lateral tool 36 includes proximal and distal ends (38 and 42), with the distal end 42 forming the leading edge that is inserted into femur 28. In order to allow tool 36 to be connected to an impact hammer (FIGS. 20-21), the proximal end 38 includes a threaded aperture 44. It is also possible to couple tool 36 to the impact hammer via a quick release mechanism. The use of the impact hammer is described in greater detail hereinafter. Although the size and shape of femoral implants vary, often times the lateral face 22 is curved to match the contour of the femur 28. As such, lateral tool 36 includes an outer wall 46 with an arcuate extent 48. Lateral tool 38 further includes opposing side walls 52. A curved or arcuate interior portion 54 is defined in the area between the opposing and outer walls 52. The shape and geometry of tool 36 may be changed to accommodate different types of prosthetics.

In one embodiment, each side wall 52 of lateral tool 36 includes a first angled extent 56 and a second curved extent 58. As illustrated, angled extent 56 is located near proximal end 38 of the tool 36 while the curved extent 58 is located at the distal end 42 of tool 36. The curved extents 58 of tool 36 are preferably angled and sharpened. All of the edges 60 surrounding interior portion 54 may be sharpened to facilitate insertion of tool 36. These sharpened edges 60 cut the bone growth along the bone/implant interface and otherwise allow for the insertion of tool 36. In order to allow the surgeon to gauge how far tool 36 has been inserted, a window 62 can be formed within one or both of the side walls 52. Distal end 42 of tool 36 optionally includes a curved and sharpened leading edge 64. Sharpened leading edge 64 and sharpened edges 60 allow lateral tool 36 to be inserted as closely as possible along the interface between the femur/implant. This, in turn, allows for the efficient removal of implant 20.

Medial Implant Removal Tool

Figure 3:
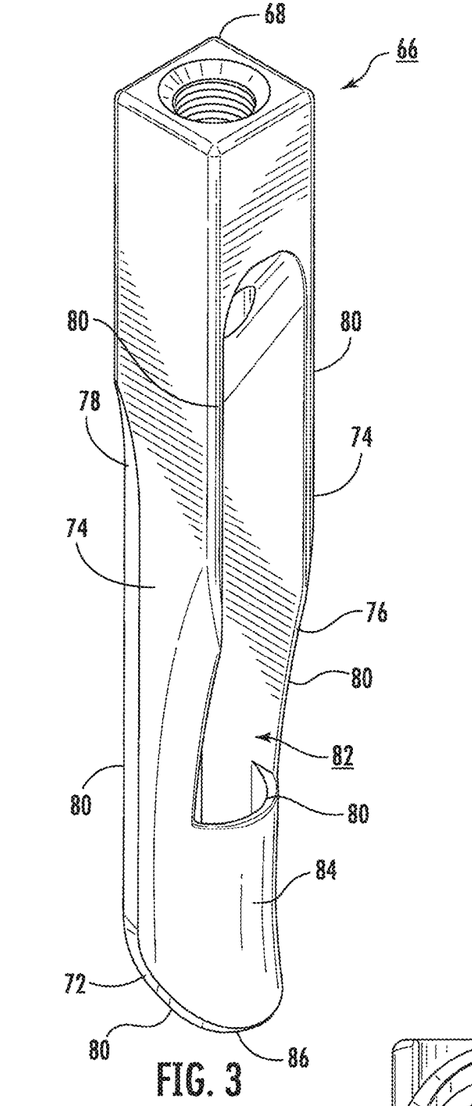
FIG. 3 is a perspective view of a medial implant removal tool.
Figure 4:
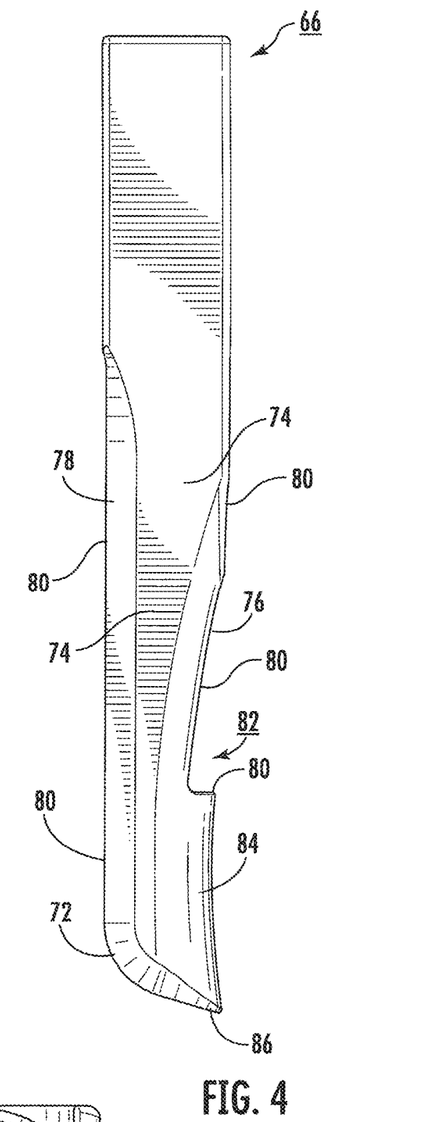
FIG. 4 is a side view of a medial implant removal tool.
Figure 5:
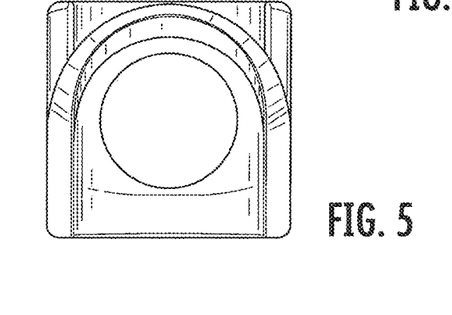
FIG. 5 is a bottom view of the medial implant removal tool.

With reference to FIGS. 3-4, the medial tool 66 includes proximal and distal ends (68 and 72) as well as opposing side walls 74. Side walls 74 are defined by inner and outer edges (76 and 78), and in a preferred embodiment, outer edges 78 of walls 74 are sharpened. However, unlike lateral tool 36, medial tool 66 is not closed. Rather, medial tool 66 includes a generally central opening 82. The purpose of opening 82 is described hereinafter. All of the inner and outer edges 80 surrounding central opening 82 are preferably sharpened. A U-shaped trough 84 with a sharpened leading edge 86 is formed at distal end 72 of medial tool 66. Medial tool 66 is adapted to be inserted between femur 28 and medial side 24 of femoral implant 20. All of the sharpened edges 80 assist with insertion, including outer edges 78, inner edges 76, and leading edge 86. Furthermore, neck 34 of femoral implant 20 is allowed to extend through opening 82 of medial tool 66. In this regard, opening 82 is specifically sized to accommodate neck 34 and end of implant 20. The sharpened edges surrounding opening 82 allows tool 66 to cut along the anterior and posterior sides as well as the medial aspect.

Method of Using Lateral and Medial Tools

Figure 20:
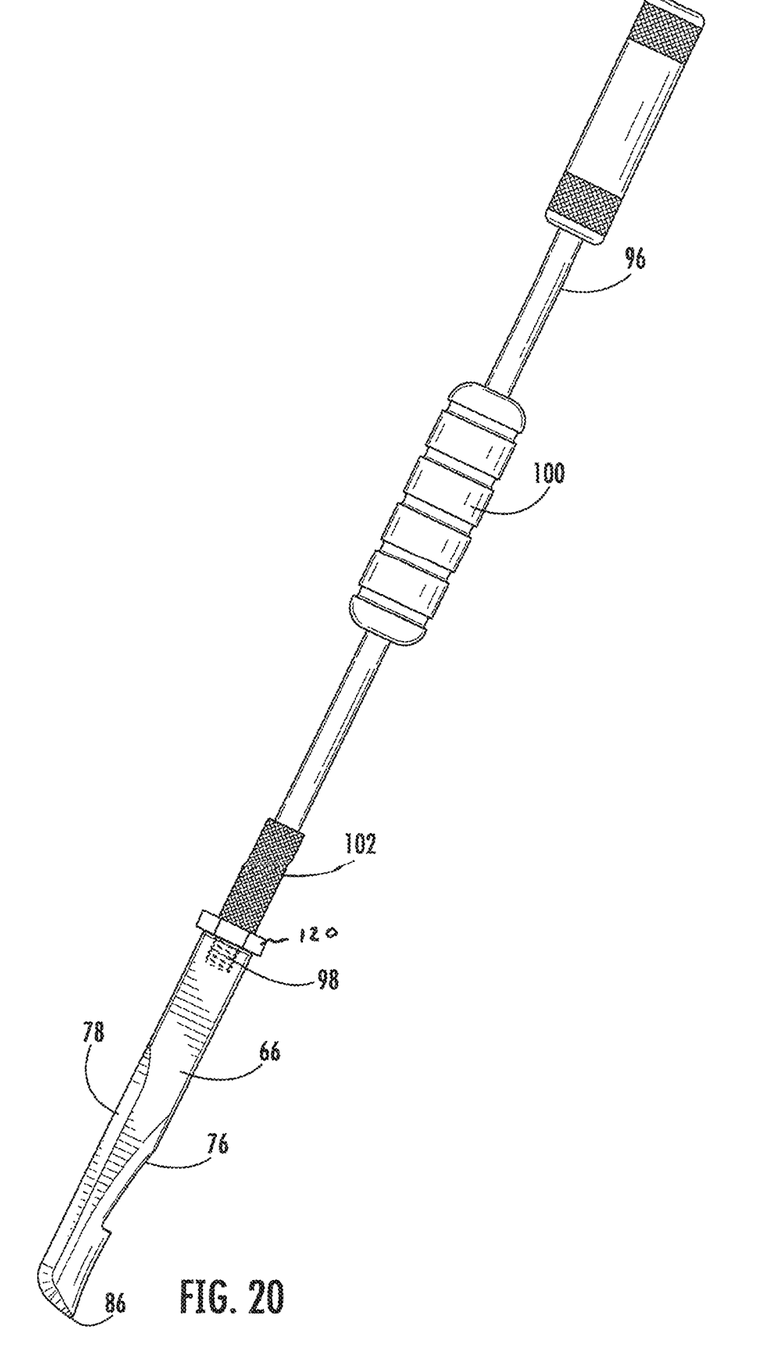
FIG. 20 is a view of an impact hammer secured to a medial tool.
Figure 21:
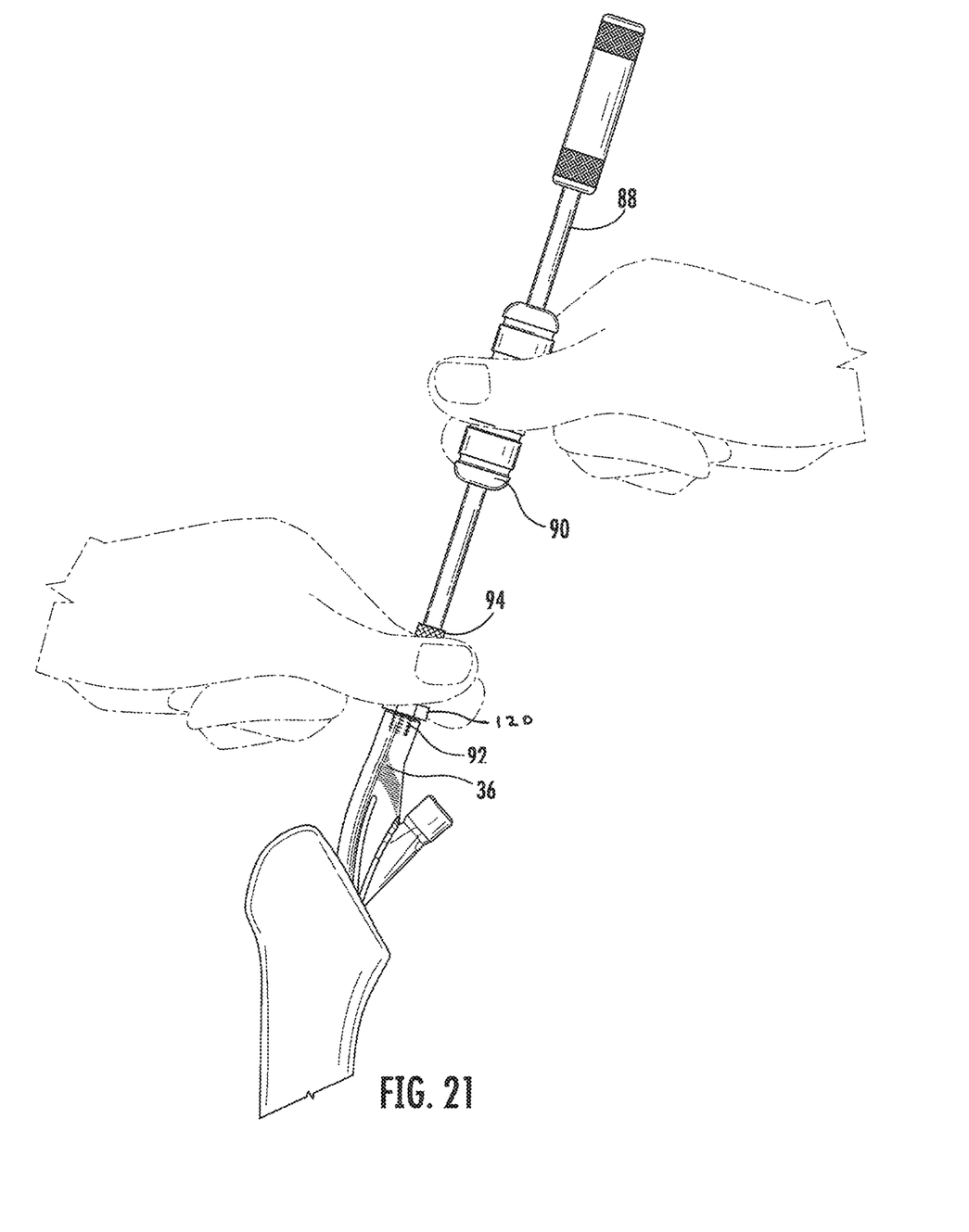
FIG. 21 is a view of an impact hammer being used to insert a lateral tool.

The method of using the tools (36 and 66) is next described in connection with FIGS. 13-19. Both lateral and medial tools (36 and 66) can be used in conjunction with one another to remove femoral implant 20. However, the present disclosure is not limited to the use of both tools (36 and 66) and the advantages of the invention can be realized by using either tool (36 or 66) individually. Each tool is inserted into the bone via an associated impact tool (88 and 96)(FIGS. 20-21). More specifically, a first impact tool 88 includes a threaded extent 92 that is secured to the threaded aperture 44 of lateral tool 36. A nut 120 can be secured immediately above threaded extent 92 to prevent the unintended rotation of impact tool 88 relative to lateral tool 36. Impact tool 88 includes a textured extent 94 that allows the surgeon to manipulate lateral tool 36 during insertion. The surgeon uses first impact tool 88 to guide the leading edge 64 and curved extents 58 of lateral tool 36 into femur 28. A weighted slide 90 is used as a hammer to apply force to the top of tool 36. During this insertion, bone growth between the femoral implant 20 and femur 28 is cut. Second impact tool 96 is substantially similar to the first impact tool 88 and is likewise used to position and insert medial tool 66. Namely, second impact tool 96 allows the leading edge 86 and outer and inner edges (78, 76) of the medial tool 66 (as well as all edges 80 surrounding opening 82) to cut bone growth between femoral implant 20 and the femur 28 during the process of insertion. Second impact tool 96 likewise includes a threaded extent 98, a sliding weight 100, and a guide 102. Each impact tool (88, 96) can be manually inserted or can optionally be inserted via a pneumatic hammer.

Figure 18:
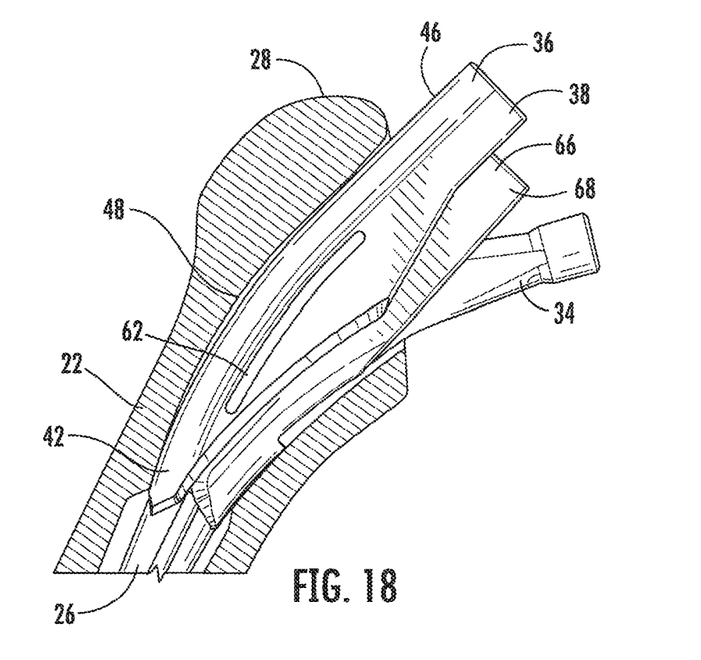
FIG. 18 illustrates the full insertion of both the lateral and medial tools.
Figure 19:
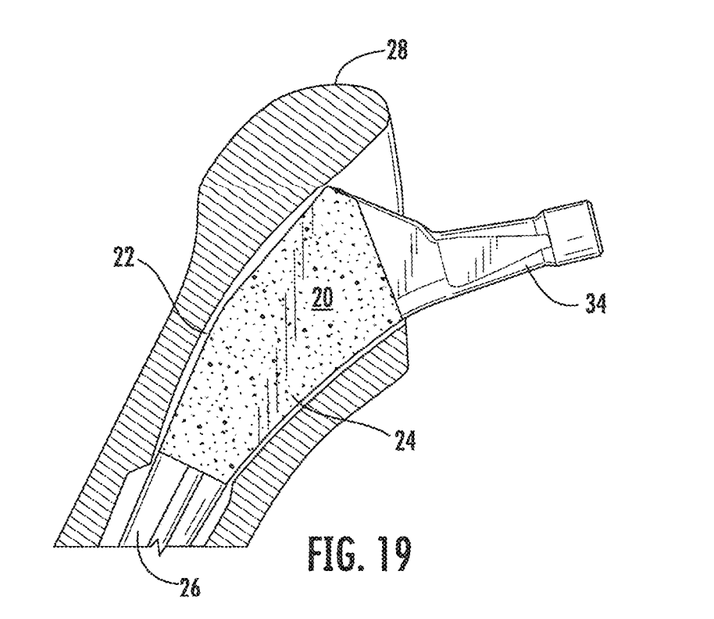
FIG. 19 illustrates the femoral implant following the removal of the lateral and medial tools.

As described, the lateral and medial implant removal tools (36 and 66) can be used in conjunction with one another. It is preferred that lateral tool 36 is inserted and removed prior to the insertion and removal of medial tool 66. FIG. 18 illustrates that in the preferred embodiment lateral and medial tools (36 and 66) are inserted into femur 28 such that the curved extents 58 of lateral tool 36 overlap outer edges 78 of medial tool 66. The overlapping edges (58 and 78) ensure that all bone growth immediately surrounding implant 20 is removed. This ensures the efficient removal of implant 20 with minimal bone loss.

ALTERNATIVE EMBODIMENTS

Figures 6, 8:
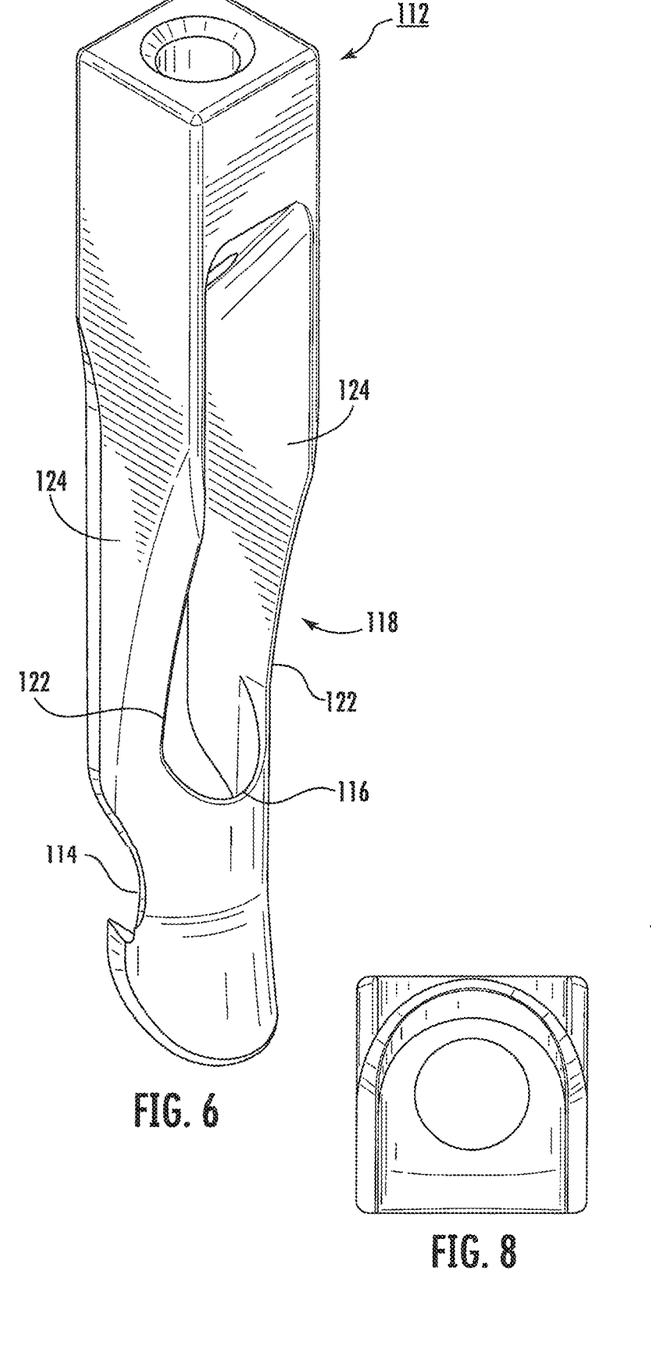
FIG. 6 is a perspective view of an alternative embodiment of the medial implant removal tool.
FIG. 8 is a bottom view of the alternative embodiment of the medial implant removal tool.
Figure 7:
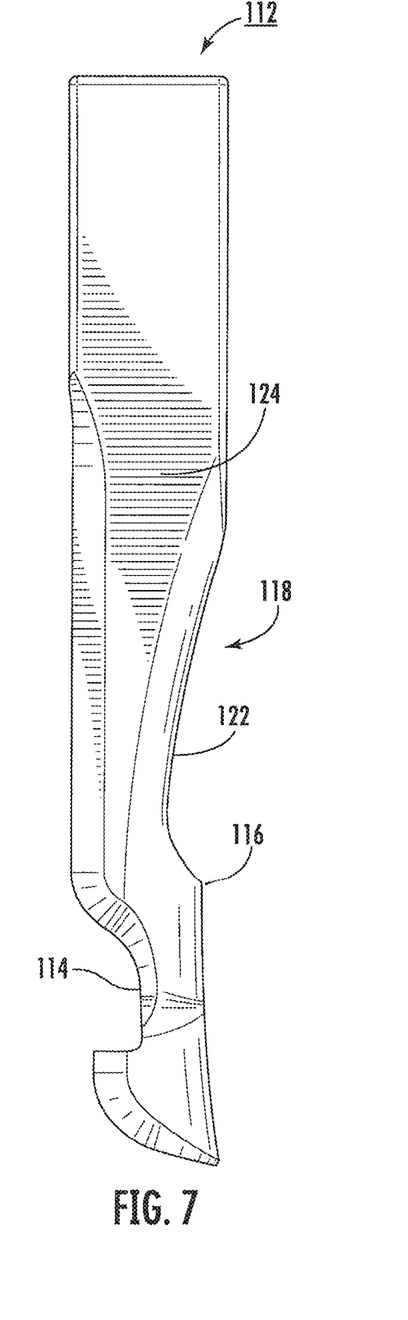
FIG. 7 is a side view of the alternative embodiment of the medial implant removal tool.

An alternative embodiment of medial tool 112 is depicted in FIGS. 6-8. This tool 112 is generally the same as medial tool 66 (FIGS. 3-4), but includes a side cut out 114 leading to a narrower distal size when compared to the opening of 188. Medial tool 112 also includes an opening 118 to accommodate different neck geometries and has a lower rounded and sharpened edge 116. This embodiment also includes opposing side walls 124 with inner sharpened edges 122.

Figure 9:
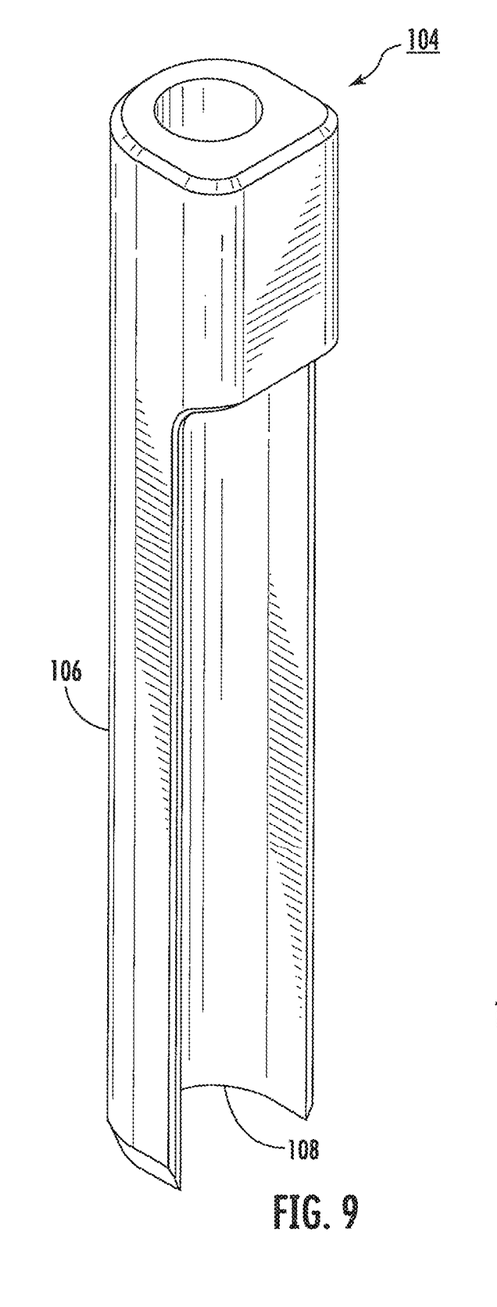
FIG. 9 is a perspective view of an alternative embodiment of the lateral implant removal tool.
Figure 10:
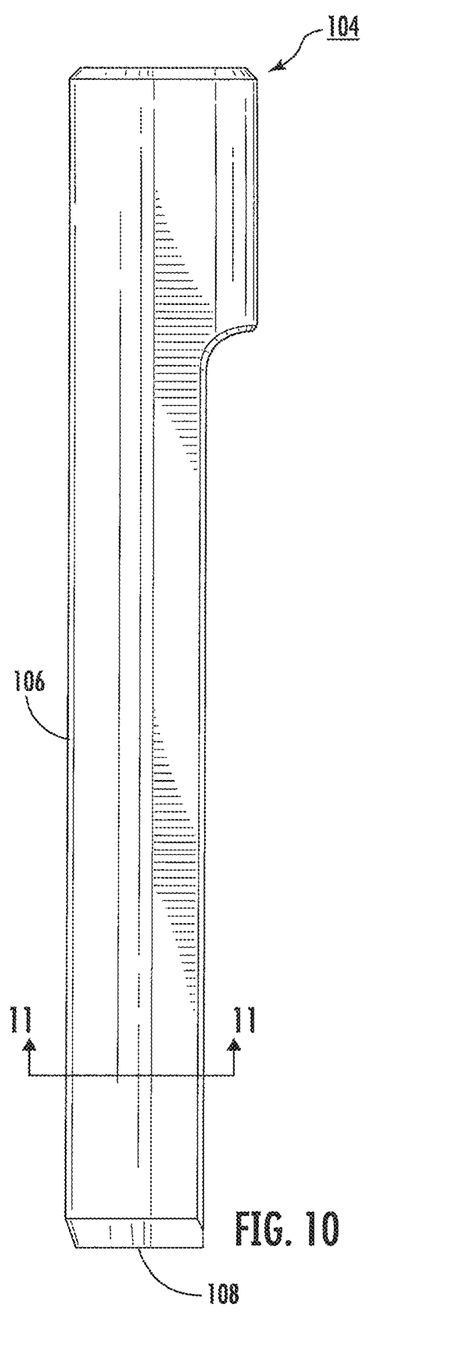
FIG. 10 is a side view of an alternative embodiment of the lateral implant removal tool.
Figure 11:
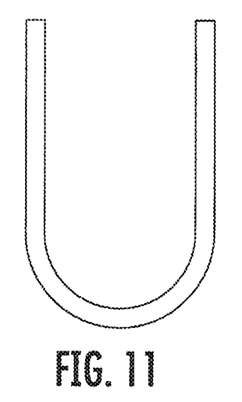
FIG. 11 is a sectional view of the lateral implant removal tool taken along line 11-11 of FIG. 10.
Figure 11A:
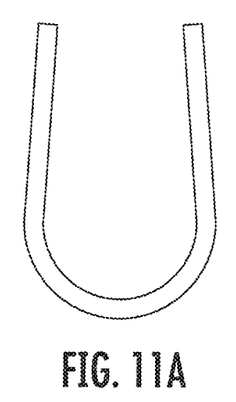
FIGS. 11A-11E are alternative embodiments showing different cross sections of the lateral implant removal tool of FIG. 10, each of which is taken along line 11-11.
Figure 11B:
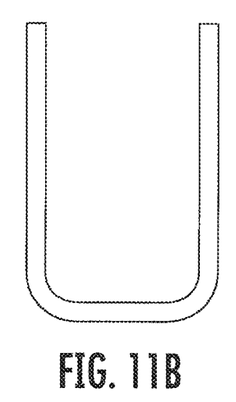
Figure 11C:
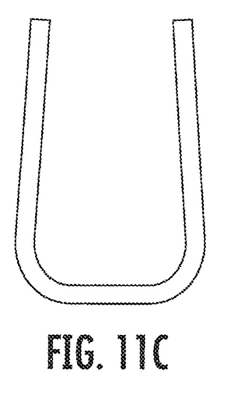
Figure 11D:
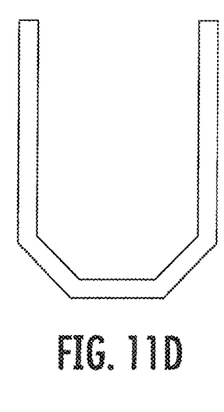
Figure 11E:
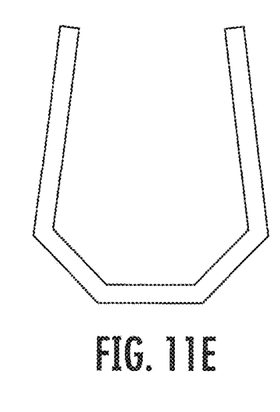
Figure 12:
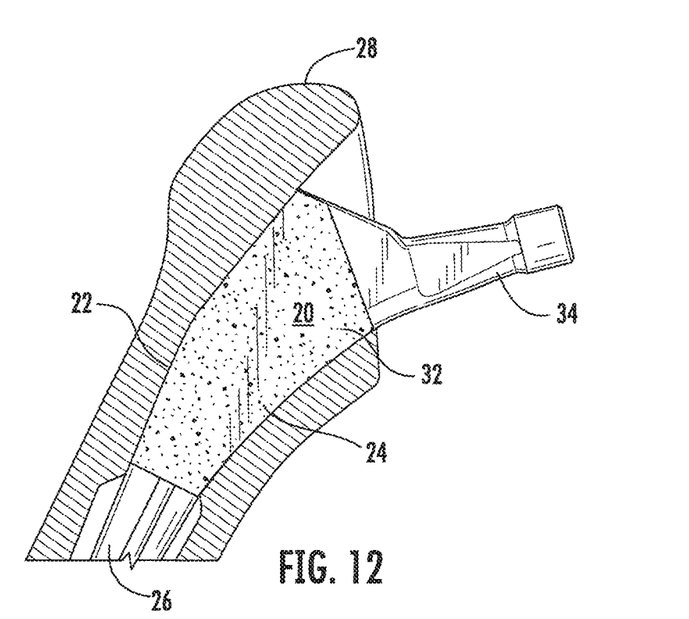
FIG. 12 illustrates a femoral implant prior to the insertion of the lateral and medial tools.

An alternative embodiment of the lateral tool 104 is depicted in FIGS. 9-10. This embodiment is the same in most respects to lateral tool 36. It includes a generally straight back wall 106 and a more curved leading edge 108. This geometry may be preferred for the lateral tool depending upon the shape and size of the implant being removed. FIG. 11 illustrates the U-shaped cross section that makes up the body of this alternative lateral tool 104. However, any of a variety of cross sectional shapes can be used. FIGS. 11a-11e illustrate some possible cross sectional shapes for the lateral tool.

Although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. An implant removal tool for removal of a femoral implant that includes a neck, the tool comprising:

proximal and distal ends and opposing side walls, with each side wall including inner and outer edges, an opening formed through the tool, the tool adapted to be inserted along an edge of the femoral implant with the neck being received within the opening, wherein a window that remains open throughout insertion is formed within each of the opposing side walls.

2. The implant removal tool as described in claim 1, further comprising:

a U-shaped trough positioned at the distal end of the tool.

3. The implant removal tool as described in claim 1, wherein the outer edges of the tool are sharpened.

4. The implant removal tool as described in claim 3, wherein the U-shaped trough includes a sharpened leading edge.

5. The implant removal tool as described in claim 1, wherein the tool includes a U-shaped trough at its distal end.

6. A system for removing a femoral implant, the femoral implant positioned within a femur and including lateral and medial sides, a stem and a neck, the system comprising:

a lateral tool including proximal and distal ends and an outer wall, the lateral tool further including opposing side walls defining an interior, the lateral tool adapted to be inserted between the femur and the lateral side of the femoral implant;

a medial tool including proximal and distal ends, the medial tool including opposing side walls, with each side wall including inner and outer edges, an opening formed through the medial tool, the medial tool adapted to be inserted between the femur and the medial side of the femoral implant with the neck of the implant extending through the opening, wherein a window is formed within each of the opposing side walls of the lateral tool.

7. The system as described in claim 6, wherein the side walls of the lateral tool include a first angled extent and a second curved extent.

8. The system as described in claim 7, wherein the second curved extent is sharpened.

9. The system as described in claim 6, wherein the medial tool includes a U-shaped trough with a sharpened leading edge positioned at the distal end.

10. A system for removing a femoral implant, the femoral implant positioned within a femur and including lateral and medial sides, a stem and a neck, the system comprising:

a lateral tool including proximal and distal ends and an outer wall, the lateral tool further including opposing side walls defining an interior, the lateral tool adapted to be inserted between the femur and the lateral side of the femoral implant;

a medial tool including proximal and distal ends, the medial tool including opposing side walls, with each side wall including inner and outer edges, an opening formed through the medial tool, the medial tool adapted to be inserted between the femur and the medial side of the femoral implant with the neck of the implant extending through the opening, wherein with both the lateral and medial tools inserted into the femur, the opposing side walls of lateral tool overlap the outer edges of the medial tool.

\* \* \* \* \*